April 28, 1959
G. B. FOSTER
2,884,530
STANDARDIZING MEANS
Filed July 31, 1956
2 Sheets-Sheet 1
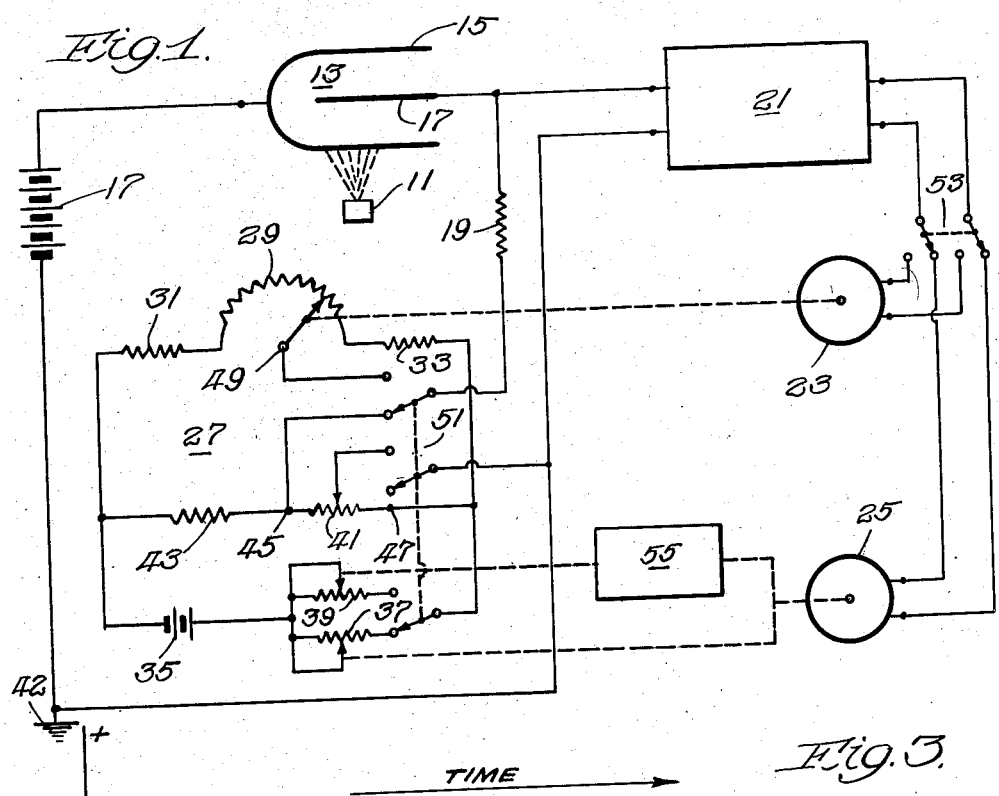
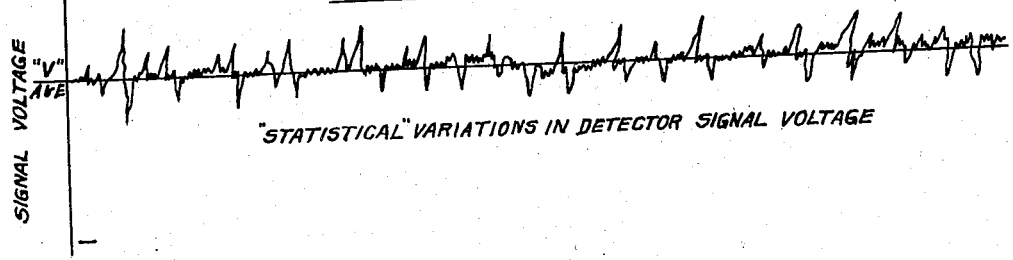
"STATISTICAL" VARIATIONS IN DETECTOR SIGNAL VOLTAGE
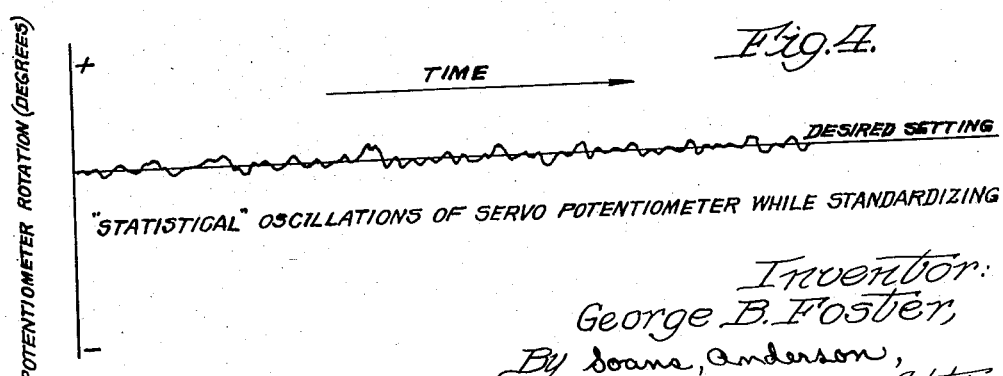
"STATISTICAL" OSCILLATIONS OF SERVO POTENTIOMETER WHILE STANDARDIZING
Inventor:
George B. Foster,
By Soans, Anderson,
Luedeka & Fitch  Attys.

April 28, 1959 G. B. FOSTER 2,884,530
STANDARDIZING MEANS
Filed July 31, 1956 2 Sheets-Sheet 2

Inventor:
George B. Foster,
By Soans, Anderson, Luedeka
& Fitch Attys.

United States Patent Office 2,884,530
Patented Apr. 28, 1959

2,884,530

STANDARDIZING MEANS

George B. Foster, Worthington, Ohio, assignor to Industrial Nucleonics Corporation, Columbus, Ohio, a corporation of Ohio Application July 31, 1956, Serial No. 601,160

5 Claims. (Cl. 250—83)

The present invention relates generally to standardizing means for measuring systems, and more particularly to means reducing or minimizing source standardization error in an automatically standardizing nuclear gauge.

The calibration of a nuclear gauge depends upon a number of quantitative factors which are subject to variation. A change in one or more of such factors which can influence the readings of a nuclear gauge is generally referred to as a "drift." One important source of such drift in a nuclear gauge is caused by the progressive decay of the radioactive source used in the gauge. This drift is generally referred to as "source drift." As the source decays, the total quantity of radiation is reduced, but the percentage of radiation emitted at any given energy level remains the same, so that the shape of the energy distribution curve of the emitted particles does not change.

Standardization is the process of adjusting certain components of the gauge so as to restore or maintain its ability to reproduce the readings for which it was calibrated without requiring any repetition of any part of the calibration procedure. Provision is generally made in a nuclear gauge for periodic standardization to correct for the source drift. However, the prior standardization systems cannot be relied upon to completely reset the gauge so as to reproduce the original or calibrated readings. This standardization error is due to the "statistics" which are an inherent characteristic of the usual ionization chamber type nuclear gauge. "Statistics" is a term used to describe random signal voltage variations, seemingly caused by fluctuating ionization currents, but which reflect the build-up and decay of discrete ionization processes within the ionization chamber. The effect of statistics is particularly evident at high instrument sensitivity, and when the number of particles reaching the ionization chamber is at a maximum, i.e. when there is no absorber in the measuring gap.

In the usual standardizing system used in connection with a null-type nuclear gauge, the signal voltage developed across a load resistor by the flow of ionization current through it is balanced by an equal and opposite bucking voltage from the measuring circuit. This bucking voltage is variable by means of a standardizing potentiometer.

In an automatically standardizing gauge, the adjustment of the standardizing potentiometer is performed by a suitable driving means such as a servo-motor, which attempts to drive the potentiometer to the desired balance point. Near the balancing point, however, the statistics point. The driven potentiometer is obliged to come into play. The driven potentiometer is obliged to follow the variations in signal voltage which fluctuates continuously in an unpredictable manner, causing the standardizing potentiometer to hunt back and forth around and about the vicinity of the desired setting.

Standardization error occurs as a result of the fact that the standardizing phase may end at any arbitrary point of time removing power from the potentiometer drive and allowing the potentiometer adjustment to remain at the setting it happens to occupy at the instant power was removed. This is true whether the duration of the source standardization is determined by an electrical timer or some other means.

The objects of the present invention are to provide an automatically standardizing nuclear gauge which includes an improved means of standardization; to provide an automatically standardizing nuclear gauge having means for minimizing standardization error caused by the statistical nature of the source emanation; to provide means for reducing source standardization error which may be simply and economically incorporated into existing automatically standardizing nuclear gauges; to provide a standardizing system for a nuclear gauge which minimizes standardization error without requiring any additional standardization time; and to provide a nuclear gauge having such improved standardizing means which is simple in construction and effective and durable in use.

Further objects and advantages of the invention will become apparent from the following description and accompanying drawings which illustrate one form of the invention.

Figure 1 is a diagram of a nuclear radiation gauge which includes means for minimizing source standardization error in accordance with the present invention;

Figure 2:
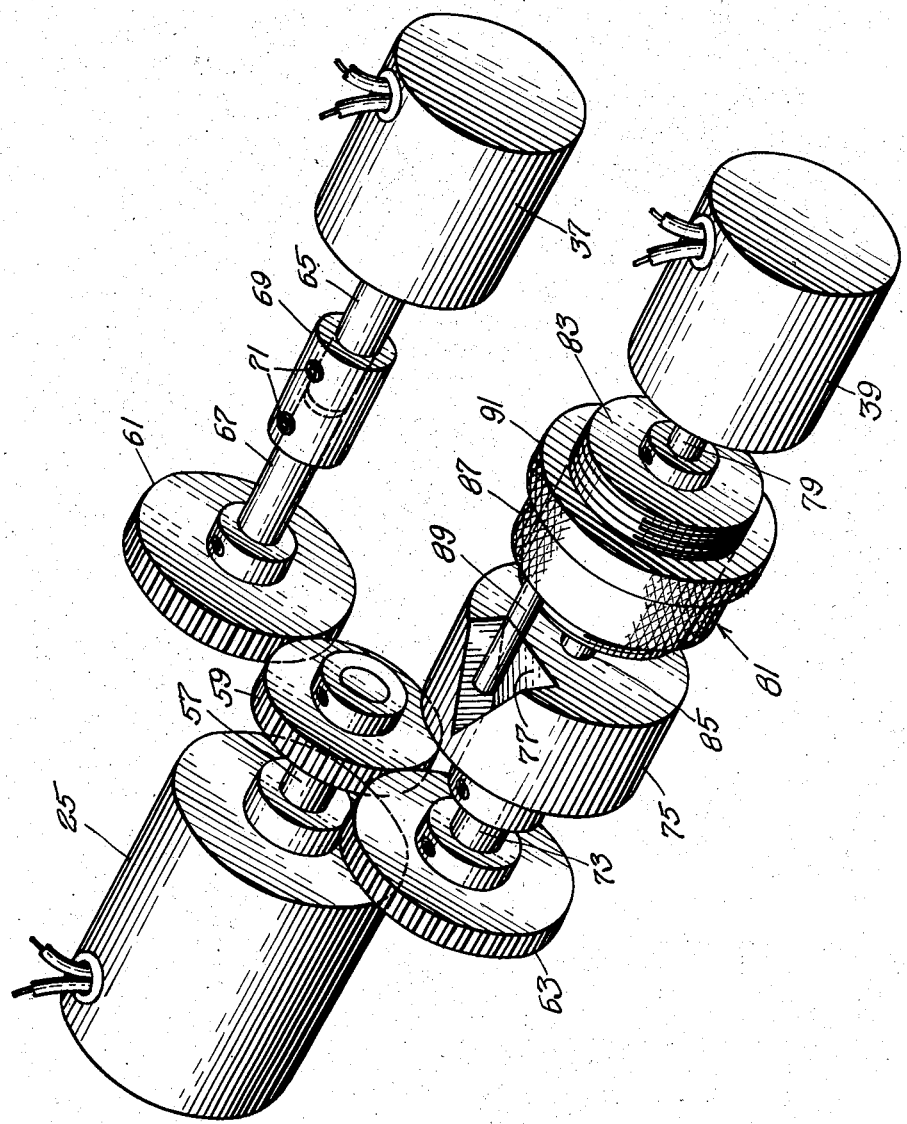
Figure 2 is a perspective view of one form of coupling which may be employed between the standardizing servo-motor and the standardizing potentiometers shown in Figure 1.

Figure 3 is a typical graph illustrating the statistical variations in detector signal voltage caused by the statistical emission of particles from the radioactive source in a gauge such as that shown in Figure 1; and Figure 4 is a graph illustrating the statistical variations or oscillations of a normal standardizing potentiometer in an automatically standardizing nuclear gauge caused by the statistical variations in detector signal voltage.

The present invention is illustrated in connection with a servo-driven null-type measuring system. Since there are a great number of specific forms of such systems commercially available, those portions of the system which are not essential for an understanding of the present invention will not be described in detail.

As seen in Figure 1, the system includes the usual radiation source 11 and spaced ionization chamber type radiation detector 13. The outer wall 15 of the chamber is connected to the positive side of a voltage source 17 and the inner electrode 17 of the chamber is connected to the usual high-meg. load resistor 19 and to the input of an impedance matching amplifier and converter 21. When a radiation falls on the detector 13 a current is caused to flow through the voltage source 17 and high-meg. resistor 19, developing a voltage across the latter. The impedance matching amplifier and converter 21 converts the high impedance signal to a usable output impedance, and transforms the D.C. input into an A.C. output for use in driving a pair of servo-motors 23 and 25. A null balance feedback system is provided in the usual fashion to balance out the input voltage so that the system is independent of amplifier gain. The input voltage is compared with the bucking voltage output of a bridge circuit 27 connected between the high-meg. resistor 19 and a suitable feedback resistor (not shown) in the amplifier portion of the impedance matching amplifier and converter 21.

The specific bridge circuit shown is designed for measuring a variation or limited range of voltages about some particular voltage. The bridge includes three parallel branches, an upper branch which includes a slide wire 29 and symmetrical dropping resistors 31 and 33 located on either side of the slide wire 29, a lower branch which includes a voltage source 35 and a pair of standardizing potentiometers 37 and 39 which are mechanically and electrically matched, only one of which is operably connected in the bridge 27 at any time, and a middle branch which includes a potentiometer 41 whose wiper or center arm is connected to ground indicated at 42 when the gauge is in measuring condition so that the voltage with respect to ground at some point along the slide wire is varied by movement of the center arm of the potentiometer 41. The middle branch also includes a resistor 43 which has a value such that the voltage at the point 45 with respect to the point 47 is the same as that at the center of the slide wire 29. Since the dropping resistors 31 and 33 are identical, the voltage at 45 and at the center of the slide wire 29 may be varied by changing the position of the center arm of the potentiometer 41.

Suppose the voltage source 35 is such as to provide a voltage of −20 volts and that resistors 31 and 33 are equal and of such value that the voltage span across the slide wire is 2 volts. Under these conditions, depending on the center arm of the potentiometer 41, the voltage with respect to ground at point 49 may vary plus or minus one volt about any voltage from 0 to −10 volts. A potentiometer control such as 41, which sets the operating point about which a slide wire voltage varies may be referred to as a center scale potentiometer or operating point control.

A suitable ganged switch 51 is provided so as to change the bridge circuit 27 from a measuring position to a standardizing position. When the switch 51 is set in its measuring position, the high-meg. resistor 19 connects with the center arm of the slide wire 29, the center arm of the center scale potentiometer 41 is connected with the impedance matching amplifier 21, and the standardizing potentiometer 39 is connected in the lower branch of the bridge circuit 27. When the switch is set at standardizing position the high-meg. resistor 19 is connected with the point 45 at the center of the middle branch of the bridge circuit 27, the point 47 is connected with the impedance matching amplifier 21 and the potentiometer 37 is connected in the lower branch of the bridge circuit 27.

The A.C. output of the converter 21 connects with a switch 53 which is movable so as to be connectable either to the measuring servo-motor 23 or to the standardizing servo-motor 25. The drive shaft of the measuring servo-motor 23 connects with and drives the center arm of the slide wire 29, and the standardizing servo-motor 25 connects with and drives the matched potentiometers 37 and 39.

During the measuring cycle, whenever there is a difference between the bucking bridge voltage output and the high-meg. voltage, a signal appears at the input of the D.C. amplifier 21. After amplification, this signal is converted into an A.C. voltage which is amplified and used to operate the servo-motor 23 which drives the center arm of the slide wire 29 to a point of balance. The servo-motor 23 may also be connected to a measuring indicator (not shown) which has a scale graduated in suitable units such as weight per unit area. The instrument may be calibrated by adjusting the center scale potentiometer 37 and the potentiometer 39. It will be noted that during the measuring cycle, the potentiometer 37 is disconnected from the circuit.

When one desires to compensate for changes outside of the amplifier and converter 21, such as the aging of power supply components, source decay, or the accumulation of foreign material on the source window, the system is placed in a standardizing condition by shifting the switches 51 and 53 to standardize positions.

During standardization, the absorber or material to be measured is removed from the measuring gap, that is, the space between the source 11 and the detector 13. The detector signal voltage appears in the usual fashion across the high-meg. resistor 19. The standardizing servo-motor 25 drives the potentiometer 37 to a point where the detector signal voltage is cancelled by an equal and opposite voltage across the center scale potentiometer 41. Since the signal voltage is varying because of the statistical emission of particles from the source, the wiper of the potentiometer 37 will oscillate around an average setting. As previously indicated, the center arm of the matched potentiometers 37 and 39 are driven by the standardizing servo-motor 25. In accordance with this invention, the center arm of the potentiometer 37 is tightly coupled to the driving shaft of the servo-motor 25 and the center arm of the potentiometer 39 is loosely coupled by suitable means 55 to the servo-motor 25 in a manner so that it is moved to a position corresponding to a position on the potentiometer 39 which is in the center of its oscillations.

A typical graph showing the statistical variations in the detector signal voltage is illustrated in Figure 3. It is seen that the signal voltage varies in a random fashion about an average voltage. This random variation of signal voltage will produce a statistical oscillation of the center arm of the potentiometer 37 during standardization. A typical plot of the rotation of the center arm of the potentiometer 37 against time is illustrated in Figure 4.

A better understanding of the type of coupling required between the servo-motor 25 and the matched potentiometers 37 and 39 may be obtained from the structure shown in Figure 2. In this figure a specific form of mechanical coupling means is illustrated. It should be understood, however, that one may substitute other mechanical or electronic coupling means for that which is illustrated. The servo-motor 25 has a drive shaft 57 which connects with a drive gear 59. The drive gear 59 intermeshes with and drives a pair of diametrically opposed, matched gears 61 and 63 in the same direction. The gear 61 is directly coupled to the shaft 65 of the potentiometer 37 through a shaft 67 and sleeve or collar 69. One may adjust the position of the potentiometer shaft 65 relative to the shaft 67 by loosening set screws 71 in the sleeve 69.

The gear 63 is suitably connected through a shaft 73 to a generally cylindrical driving member 75 which has a wedge-shaped portion cut from its surface as indicated at 77. The driving member 75 is connected to the shaft 79 of the potentiometer 39 through an intermediate coupling member 81. The intermediate coupling member 81 includes a threaded cylindrical section 83 which is axially aligned with the driven member 75. The shaft 79 of the potentiometer extends through a suitable, longitudinally extending central passageway in the cylindrical section 83 of the intermediate coupling member 81 and projects into a centrally positioned recess 85 in the outer face of the cylindrical member 75. The intermediate member 81 also includes an outer knurled collar 87 which is threaded on the cylindrical inner section 83. A suitable pin 89 projects rearwardly from the back face of the collar 87 and extends into the wedge-shaped cut-out in the driving member 75. The amount to which the pin 89 projects into the cut-out portion 77 may be adjusted by turning the collar 87 on the threaded section. A lock nut 91 is provided for fixing the lateral position of the collar 87 and pin 89.

As previously pointed out, the potentiometers 37 and 39 are suitably matched both electrically and mechanically. It is evident that a rotation of the servo-motor shaft 57 will produce a predetermined rotation of the potentiometer shaft 65. At the same time, it will produce a rotation of the potentiometer shaft 79 but the extent of this rotation may be less than that of the shaft of the potentiometer due to the lost motion provided by the play of the pin 89, within the wedge-shaped opening in the driving member 75. It will be noted that this play or lost motion exists only when the direction of rotation of the servo-motor shaft 57 reverses.

If the pin 89 is adjusted within the cut-out portion 77 of the member 75 so that its end is positioned at a point such that the permissible lost motion is approximately equal to the statistical band width, that is, the amount of rotation caused by the "statistical" fluctuation of the oscillation of the servo-motor shaft 65, the setting of the potentiometer 39 will come to be located near the center of the statistical band width, which is the desired setting of the potentiometer 39.

It should be noted that one could not use a single potentiometer connected to the servo-motor 25 through a loose coupling since this would merely allow a certain amount of slack in the feedback system whereupon the standardizing potentiometer would lose its tightness of control, and the only result would be that more revolutions of the servo-motor would be required in order for the potentiometer to follow the statistics.

It is obvious that the disclosed coupling between the shaft 57 of the servo-motor 25 and the shafts 65 and 79 of the potentiometers 37 and 39 respectively, can be modified widely without altering the operation of the couplings. For example, the positions of the members 75 and 81 may be reversed, the cut-out portion 77 of the driving member 75 may have a different shape, etc. In addition, one could substitute other equivalent mechanical or electrical coupling means for that disclosed.

Referring once again to Fig. 1, when the system is in standardizing position, the servo-motor 25 is in driving relation to the two matched potentiometers 37 and 39. During this period, the potentiometer 39 is open circuited while the potentiometer 37 is varying the bridge voltage. The servo-motor 25 will drive the potentiometer 37 to a point where the voltage across the high-meg. resistor 19 is cancelled by an equal and opposite voltage across the center scale potentiometer 41. Since the voltage is varying because of statistics, the center arm of the potentiometer 37 will oscillate around an average setting. Because of the lost motion in the coupling between the servo-motor shaft 57 and the potentiometer shaft 29, the center arm of the potentiometer 39 will be positioned near the center of these oscillations.

At the end of standardization, the switches 51 and 53 will return the system to measuring condition. The potentiometer 39 now replaces potentiometer 37 in the circuit. Since the two potentiometers 37 and 39 are matched electrically and mechanically, the voltage on the bridge during measurement will be close to the average of the voltage variations which the statistics produced during standardization.

In the usual commercial gauge or measuring system, the standardization cycle is performed automatically. This standardization cycle is normally arranged so as to occur automatically at regular intervals or whenever the average readings vary from a desired reading by a given amount. In such cases, the switches 51 and 53 are replaced by relays within the automatic standardizing control system.

The present invention clearly is not limited to the circuit disclosed but is applicable to any source standardizing system which includes a source potentiometer which is driven so as to cancel out the voltage through a high-meg. load resistor of the system.

Existing servo-driven null-type measuring systems can be easily modified so as to reduce their standardization error in accordance with the teachings of the present invention. All that is necessary is to provide a second standardizing potentiometer which is electrically and mechanically like that already in the system and to suitably couple the standardizing potentiometers with the standardizing servo-motor and to include switching means for connecting the tightly coupled potentiometer to the servo-motor during standardization and the loosely coupled potentiometer to the servo-motor when measuring.

This disclosed system for reducing standardizing error is simple in construction and thoroughly effective in operation.

The invention above described may be varied in construction within the scope of the claims, for the particular device selected to illustrate the invention is only one of many possible embodiments of the same. The invention, therefore, is not to be restricted to the precise details of the structure shown and described.

Various features of the present invention which are believed to be new are set forth in the accompanying claims.

I claim:

1. In an automatically standardizing nuclear gauge which includes a radioactive source and a detector spaced from said source for receiving and detecting radiation emitted from said source, a load resistor connected to said detector and a bridge circuit which includes a standardizing potentiometer connected to said load resistor, said bridge circuit being automatically adjustable so as to provide a bucking voltage equal to the voltage developed across the load resistor by the flow of ionization current through it, a standardizing means comprising a driving member, a pair of matched standardizing potentiometers connected to said driving member, one of said potentiometers being coupled directly to said driving member and the other of said potentiometers being loosely coupled to said driving member in a manner so as to provide a predetermined amount of lost motion before making a driving connection whenever the driving member reverses its direction of movement, and means for connecting said directly coupled standardizing potentiometer in the bridge circuit when the gauge is being standardized and for connecting said loosely coupled standardizing potentiometer in the bridge circuit when the gauge is measuring.

2. In an automatically standardizing nuclear gauge which includes a radioactive source and a detector spaced from said source for receiving and detecting radiation emitted from said source, a load resistor connected to said detector and a bridge circuit which includes a standardizing potentiometer connected to said load resistor which is automatically adjustable so as to provide a bucking voltage equal to the voltage developed across the load resistor by the flow of ionization current through it, a standardizing means comprising a driving member, a pair of matched standardizing potentiometers connected to said driving member, one of said potentiometers being directly coupled to said driving member and the other of said potentiometers being loosely coupled to the driving member through a lost motion connection, means for adjusting said lost motion connection to vary the lost motion movement between said driving member and said other potentiometer, and means for connecting said directly coupled standardizing potentiometers in the bridge circuit when the gauge is being standardized and for connecting said loosely coupled standardizing potentiometer in the bridge circuit when the gauge is measuring.

3. In an automatically standardizing nuclear gauge which includes a radioactive source and a detector spaced from said source for receiving and detecting radiation emitted from said source, a load resistor connected to said detector and a bridge circuit which includes a standardizing potentiometer connected to said load resistor, said bridge circuit being automatically adjustable to provide a bucking voltage equal to the voltage developed across the load resistor by the flow of ionization current through it, a standardizing means comprising a driving member, a pair of matched standardizing potentiometers connected to said driving member, one of said potentiometers being tightly coupled to said driving member and the other of said potentiometers being loosely coupled to said driving member, said loose coupling including a first rotatable member which is provided with a cut-out portion of predetermined shape which is spaced radially from and which extends in the direction of the rotational axis of said first member, and a second rotatable member whose axis of rotation is substantially colinear with that of said first rotatable member, said second rotatable member having a portion extending into the cut-out portion of said first member to provide a lost motion connection between said rotatable members, and means for connecting said tightly coupled standardizing potentiometer in the bridge circuit when the gauge is being standardized and for connecting said loosely coupled standardizing potentiometer in the bridge circuit when the gauge is measuring.

4. In an automatically standardizing nuclear gauge which includes a radioactive source and a detector spaced from said source for receiving and detecting radiation emitted from said source, a load resistor connected to said detector and a bridge circuit which includes a standardizing potentiometer connected to said load resistor, said bridge circuit being automatically adjustable to provide a bucking voltage equal to the voltage developed across the load resistor by the flow of ionization current through it, a standardizing means comprising a driving member, a pair of standardizing potentiometers connected to said driving member, one of said potentiometers being tightly coupled to said driving member and the other of said potentiometers being loosely coupled to said driving member, said loose coupling including a first rotatable member which is provided with a cut-out portion of predetermined shape which is spaced radially from and which extends in the direction of the rotational axis of said member, and a second rotatable member whose axis of rotation is substantially colinear with that of said first rotatable member, said second rotatable member having a portion thereof extending into the cut-out portion of said first member to provide a lost motion connection between said rotatable members, means for varying the position of said second member relative to said first member to change the amount of lost motion movement between said rotatable members, and means for connecting said tightly coupled standardizing potentiometer in the bridge circuit when the gauge is being standardized and for connecting said loosely coupled standardizing potentiometer in the bridge circuit when the gauge is measuring.

5. In an automatically standardizing nuclear gauge which includes a radioactive source and a detector spaced from said source for receiving and detecting radiation emitted from said source, a load resistor connected to said detector and a bridge circuit which includes a standardizing potentiometer connected to said load resistor, said bridge circuit being automatically adjustable to provide a bucking voltage equal to the voltage developed across the load resistor by the flow of ionization current through it, a standardizing means comprising a driving member, a pair of standardizing potentiometers connected to said driving member, one of said potentiometers being tightly coupled to said driving member and the other of said potentiometers being loosely coupled to said driving member, said loose coupling including a first rotatable member which is provided with a generally V-shaped cut-out portion which is spaced radially from and which extends generally in the direction of the rotational axis of said member, the mouth of said V-shaped cut-out portion located adjacent one end of said first member, and a second rotatable member whose axis of rotation is substantially colinear with that of said first rotatable member, said second rotatable member having a portion thereof forming a transversely extending pin extending into the cut-out portion of said first member to provide a lost motion connection between said rotatable members, means for varying the degree to which said pin extends into said cut-out portion to change the amount of lost motion movement between said rotatable members, and means for connecting said tightly coupled standardizing potentiometers in the bridge circuit when the gauge is being standardized and for connecting said loosely coupled standardizing potentiometer in the bridge when the gauge is measuring.

References Cited in the file of this patent
UNITED STATES PATENTS

| | | |
|---|---|---|
| 2,741,941 | Madsen et al. | Apr. 17, 1956 |
| 2,745,019 | Hamacher | May 8, 1956 |
| 2,768,306 | Grubb et al. | Oct. 23, 1956 |